Dec. 14, 1943.     B. M. MARKS     2,336,493
DISTILLATION OF ORGANIC LIQUIDS POLYMERIZABLE BY HEAT
Filed July 23, 1940     2 Sheets-Sheet 1

INVENTOR.
Barnard M. Marks
BY
ATTORNEY

Dec. 14, 1943. B. M. MARKS 2,336,493
DISTILLATION OF ORGANIC LIQUIDS POLYMERIZABLE BY HEAT
Filed July 23, 1940 2 Sheets-Sheet 2
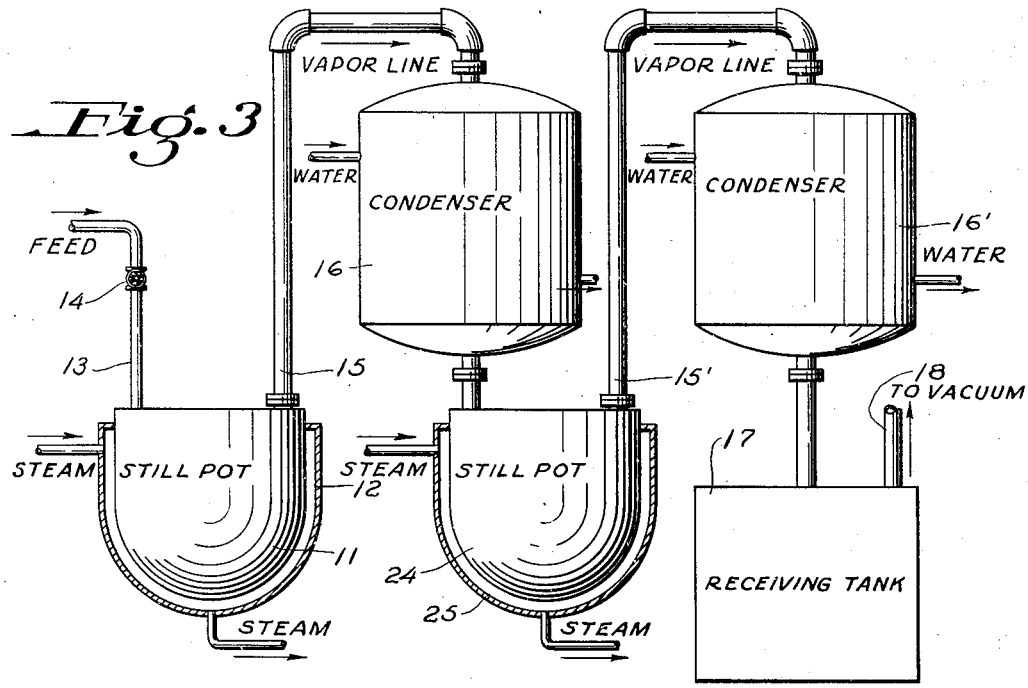
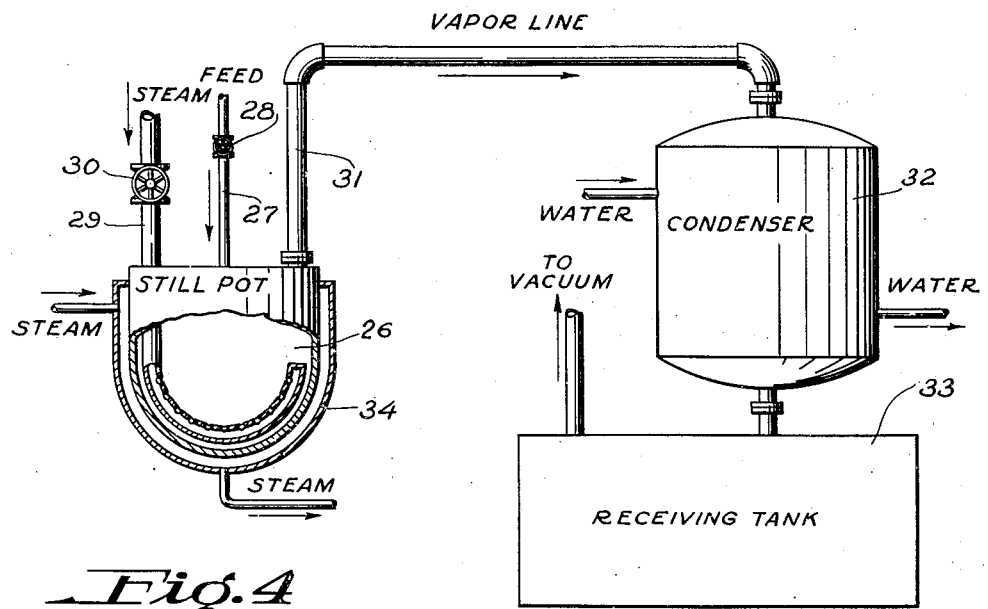
INVENTOR.
Barnard M. Marks
BY
ATTORNEY Patented Dec. 14, 1943

2,336,493

UNITED STATES PATENT OFFICE 2,336,493

DISTILLATION OF ORGANIC LIQUIDS POLYMERIZABLE BY HEAT

Barnard M. Marks, Upper Montclair, N. J., assignor to E. I. du Pont de Nemours & Company, Wilmington, Del., a corporation of Delaware Application July 23, 1940, Serial No. 347,083

7 Claims. (Cl. 202—46)

This invention relates to the distillation of organic liquids polymerizable by heat and, more particularly, to the distillation of such organic liquids, in the course of purifying same, in a manner that will avoid concurrent polymerization thereof.

During the synthesis, storage, and shipment of polymerizable organic liquids, it is customary to prevent undesired or premature polymerization thereof by the addition thereto of suitable quantities, usually very small, of substances capable of inhibiting their polymerization. When it is desired subsequently to effect polymerization of the polymerizable liquid, it is ordinarily necessary to separate from it the inhibiting substance which would interfere with or retard the desired process of polymerization.

The separation of the polymerizable liquid from the inhibiting substance must usually be effected by distillation of the former. Ordinary distillation is frequently complicated, and its yields impaired, by the occurrence of polymerization in the course of the heating of the polymerizable liquid for distillation. Such polymerization occurs in spite of the presence of the inhibitor of polymerization because, in general, the amount of such inhibitor required for the protection of the monomeric liquid in storage at ordinary temperatures, even over long periods, is not sufficient to provide protection during such distillation.

Unwanted polymerization takes place likewise in the course of distillation of such polymerizable organic liquids for other purposes, such as the removal of impurities and residues of reagents used in synthesis.

It is recognized that this difficulty is greater with some polymerizable liquids than with others. Some are more readily and quickly susceptible to polymerizing influences, or less effectively protected by the presence of inhibitors, than others. In general, also, the difficulty is greater with those of higher boiling points because the temperature required to effect distillation is the more likely to be high enough to initiate polymerization.

When any considerable amount of polymerization takes place in the course of distillation, not only are the yields of distillate correspondingly impaired, but the formation of viscous or solid masses in the equipment leads to serious operating difficulties and even to danger of rupture of equipment.

Known processes of distillation of polymerizable liquids are also frequently ineffective as regards the removal of certain undesirable impurities, such as peroxides which are commonly present in such liquids and which interfere with the orderly polymerization of the distilled monomer by exerting an unpredictable accelerating influence thereon.

An object of the present invention is to effect improvements in the distillation of organic liquids polymerizable by heat and, more specifically, to reduce or eliminate the occurrence of polymerization of such liquids in the course of their being distilled, and, thereby, to improve the economy and safety of processes involving such distillation, through improving yields and through avoidance of impairment of heat-transfer and plugging of equipment by the formation of polymer therein. Further specific improvements sought are the elimination of impurities, including peroxides, and the preparation of a distillate completely free from inhibitors of polymerization. Other objects of the invention will appear from the description given hereinafter.

The above objects are accomplished according to the present invention by heating successive small portions of an organic liquid polymerizable by heat, in contact with a heat-transfer medium maintained at a temperature such that, under the prevailing conditions, substantially immediate volatilization without appreciable concurrent polymerization of the successive small portions of the organic liquid takes place. That is, each successive small portion of the organic liquid is exposed to a temperature that will cause its volatilization under the conditions prevailing, for a period of time insufficient to initiate polymerization therein.

It is preferred, particularly where the organic liquid contains peroxides, that the temperature to which the successive small portions of the organic liquid are exposed, should be appreciably higher than the minimum required to effect immediate volatilization of the liquid under the prevailing conditions, so that the peroxides may be destroyed more completely. Also, in the preferred embodiments of the invention, the volatilization of the polymerizable liquid is promoted by agencies which reduce its boiling point, i. e., either the use of reduced pressure or the technique of steam distillation.

Treatment of the polymerized liquid in successive portions in accordance with the invention may be carried out by bringing a continuous or discontinuous stream thereof into contact with a suitable heat transfer medium by which the desired vaporization is effected, or by preheating a stream of the liquid in a closed space and releasing it therefrom continuously into a vessel maintained under conditions which will effect its rapid volatilization.

The vapor of the polymerizable organic liquid is condensed and recovered by known methods, while the unvolatilized residue remains on the heating surface or on the floor of the vessel, as the case may be.

In the drawings forming a part of this application is illustrated, diagrammatically, suitable apparatus for carrying out the present invention. Referring to the drawings:

Fig. 3 illustrates a still different apparatus for carrying out the distillation under reduced pressure; and Fig. 4 illustrates an apparatus adapted for steam distillation.

Like reference numerals refer to like parts in the several figures of the drawings.

In order most effectively to carry out the purpose of avoiding polymerization, through minimizing the exposure to high temperature, it will ordinarily be preferred to effect a reduction in the temperature of volatilization, either by operating under reduced pressure or by introducing steam so as to take advantage of the partial pressure of the latter.

In making a choice between reduced pressure and the partial pressure of steam as means of promoting vaporization at temperatures below the normal boiling point, the principal considerations will be the greater care required by the former in the construction and operation of the apparatus and, on the other hand, the capacity of the distillate to dissolve water condensed in steam distillation. Another factor in this choice, however, is the nature and amount of impurities associated with the polymerizable liquid.

In operation under reduced pressure and at correspondingly comparatively low temperatures, impurities which are less volatile than the polymerizable liquid will remain in the vessel and will be removed therefrom at intervals before the amount accumulated becomes objectionable. Ordinarily, however, it is preferred to dispose of peroxides by decomposing them, and this can be accomplished by the application of suitably higher temperature. Accordingly it is ordinarily preferred to subject the impure polymerizable liquid, in its successive small portions, to a temperature substantially in excess of the minimum required to effect its rapid volatilization; under a given sub-atmospheric pressure the boiling point of the liquid is known, or can be determined, and the temperature of the heating surface can be set at considerably higher level.

Steam distillation will be carried out ordinarily under atmospheric pressure and the temperature at which the vapors are formed, will normally be governed by the respective partial pressures of the two constituents. To maintain the temperature at a substantially higher level than this would involve the inconvenience of operation under pressure. Some impurities, however, will be disposed of by hydrolysis at the temperature of steam distillation under atmospheric pressure.

The process of the invention as operated under reduced pressure may be described as applied to the distillation, for purposes of purification or of removal of inhibitor, of methyl methacrylate, a substance for which the process of the present invention is particularly designed because of the strong tendency of this substance to polymerize at temperatures required for its distillation. The invention is applicable and valuable, however, with other organic substances of analogous behavior, including others of somewhat less strong tendency to polymerize.

Figure 1:
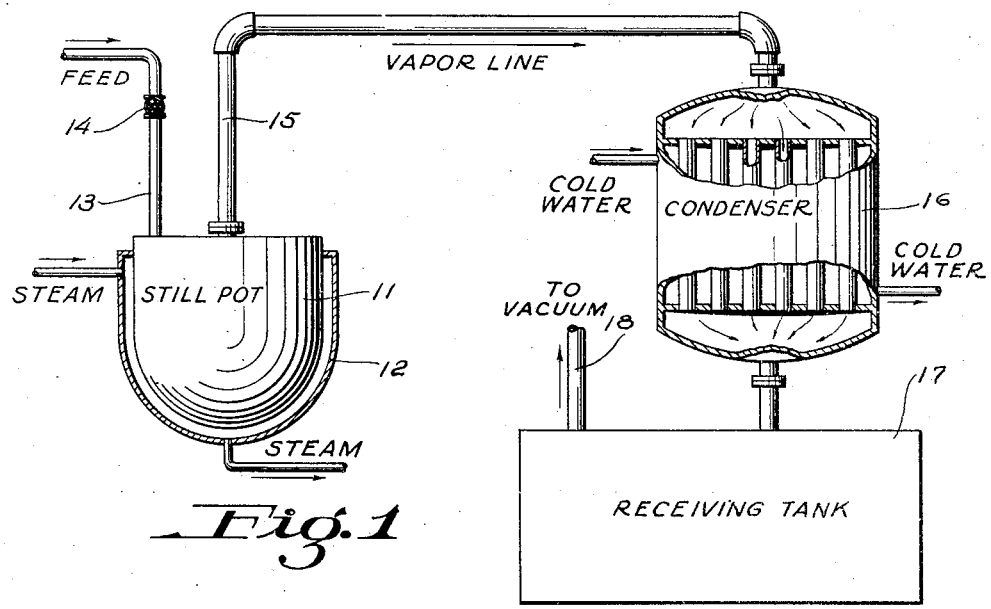
Fig. 1 illustrates simplified equipment for conducting the distillation under reduced pressure.

Simple equipment for the conduct of the process under reduced pressure is illustrated in Fig. 1. Reference numeral 11 designates a still pot equipped with the heating jacket 12 through which steam or the like may be passed to obtain the desired operating temperature. Passing into the pot 11 is the pipe line 13 fitted with a valve 14 and leading from a reservoir of the organic liquid to be distilled, the reservoir not being shown in the drawings. The vapor line 15 leads from the pot 11 to a condenser 16 which is arranged to discharge into receiving tank 17 which is connected through line 18 with a vacuum pump, not shown in the drawings.

In the distillation of methyl methacrylate, the pot 11 is heated to a temperature of 100 to 120° C. and the interior of the apparatus is maintained under a pressure of from 100 to 125 millimeters of mercury. The valve 14 is opened enough to permit the inflow, at a slow rate, of crude or otherwise impure methyl methacrylate from the reservoir. Upon falling on the heated floor of the still pot 11, the methyl methacrylate is rapidly, or practically instantaneously, vaporized and the vapor is driven up the vapor line 15 to the condenser 16 where it is condensed. The condensate is collected in the receiving tank 17.

The rate of inflow of the methyl methacrylate is adjusted by operation of the valve 14 to match the rate at which it is being volatilized. The duration of exposure of the methyl methacrylate to heat in the still pot is thus very brief and polymerization of the substance during volatilization is negligible. There is gradually accumulated in the still pot 11 a residue of impurities which ultimately becomes great enough to impair the transfer of heat from the heating jacket and to prolong unduly the duration of stay of the methyl methacrylate in the still pot. When this point is reached, the operation is interrupted and the pot cleaned out. For the sake of simplification, no means has been illustrated in the drawings for facilitating the cleaning out of the pot but in actual practice some conventional means would be provided.

If the polymerizable liquid is prone to polymerize rather rapidly even at temperatures not much above room temperature, it may be desirable that the condenser 16 be kept chilled by very cold water or ice water, and likewise that the receiver 17 be kept surrounded by ice water or cracked ice.

Figure 2:
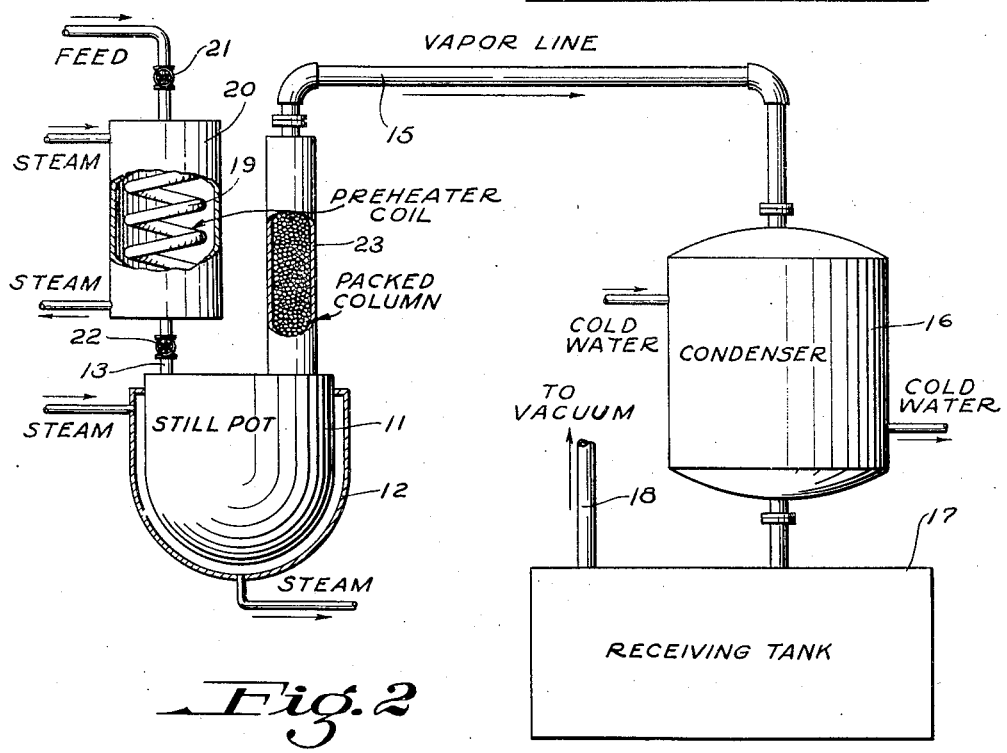
Fig. 2 illustrates another specific apparatus for carrying out the distillation under reduced pressure.

An advantageous modification of the apparatus of Fig. 1 is illustrated in Fig. 2. In this form of the apparatus there is interposed between the reservoir (not shown) and the intake line 13 a heating chamber which, as shown in Fig. 2, takes the form of a coil 19 surrounded by a jacket 20, through which may be circulated steam, hot water, or other fluid at the desired temperature. In the line connecting the reservoir with the preheater coil 19 is a valve 21, and between the preheater and the still pot 11 another valve 22.

According to the method of operation desired, it is necessary to use only one of these two valves and the other can be omitted or left open. If the valve 22 is left open, or omitted, and the valve 21 used for the control of the rate of inflow, the practically instantaneous vaporization of the methyl methacrylate takes place for the most part within the heated coil 19, and the pot 11 functions primarily and principally as a receiver for the unvaporized or refluxed constituents of the liquid fed into the equipment. The pot 11 is heated as before but vaporization takes place within it only so far as the rate of feed may by accident exceed the capacity of the heated coil 19 to effect vaporization. Since thus the pot 11 is not counted upon for effecting vaporization, the impairment of heat transfer by non-volatile residues collecting in its becomes of little or no importance and it is thus unnecessary to empty these residues so frequently.

If the valve 21 is omitted, or kept open, and the rate of feed controlled by the valve 22, the heating coil 19 is at all times full of liquid, and the preheating thus applied to the liquid before it passes the valve 22 and encounters the atmosphere of reduced pressure within the flask, tends to increase the capacity of the equipment to vaporize the liquid. Under this method of operation, however, the duration of exposure of the liquid to heat is longer, and care must be taken to limit either the temperature within the heating coil 19 or the volume of the coil in proportion to the rate of feed, and thereby the time of exposure to heat in the coil, so that polymerization does not take place in the coil.

Included in the equipment shown in Fig. 2 is a packed column 23 between the pot 11 and the condenser 16. This is optional but desirable as a means of effecting a cleaner separation of the constituents of the impure liquid fed into the equipment. The receiving tank and provision for maintenance of low pressure within the equipment are as in Fig. 1.

Another desirable modification of the equipment involves the use of two still pots in series. This is illustrated in Fig. 3 in which is duplicated the pot and condenser assembly of Fig. 1 but in which the condensate from the condenser 16 falls into a second pot 24, having a heating jacket 25 and provided with a vapor line 15' and condenser 16', which latter delivers into a receiving tank 17 fitted with a vacuum connection 18 in the manner already described.

Obviously also the preheating coil 19 and rectifying column 23, shown in Fig. 2, can, if desired, be incorporated into this arrangement of flasks in series.

This arrangement of pots in series offers in some cases the advantages of cleaner separation.

In operating under reduced pressure, so as to lower the boiling point of the polymerizable liquid, the heating surface may be maintained at a temperature only slightly higher than the temperature at which the liquid will volatilize rapidly under the prevailing pressure. But it has been found desirable in many cases to maintain the temperature of the heating surface at a considerably higher level than this, as a means of effecting a decomposition of certain impurities, such as peroxides which are frequently present in the liquid, particularly after prolonged storage, and which, if carried through into the distillate, disturb the otherwise orderly progress of subsequent processes of polymerization.

Thus it is desirable to maintain the temperature of the heating surface at a level which would cause substantially immediate volatilization of successive small portions of the liquid under atmospheric pressure. Such a temperature, preferably somewhat higher than the boiling point of the liquid under atmospheric pressure, is correspondingly considerably higher than the minimum temperature required to effect volatilization under reduced pressure.

Thus, for example, in the purification of methacrylic acid by the process of the invention, a distillation of the monomeric liquid, with separation from inhibitors, can be effected under a pressure of 20 to 30 millimeters of mercury by the use of a heating surface maintained at about 85–90° C., i. e., only slightly above the boiling point of the liquid at this pressure, which is about 52° C. But a superior distillate, more nearly free from peroxide and other undesirable volatile impurities, is obtainable if the heating surface is maintained at 100 to 120° C., which is sufficiently high to cause the decomposition of these impurities.

Analogously, styrene may be distilled under a pressure of 42 mm. from equipment maintained at about 70° C., but a higher temperature, such as 100–110° C., is preferred.

Vinyl acetate has a relatively low boiling point (73° C.) under atmospheric pressure, and does not polymerize with excessive speed at that temperature. With it, therefore, it is feasible to operate the process of the invention without the use of reduced pressure or the provision of a partial pressure of steam. Preferably, however, the source of heat should be at a temperature of 110° C. or thereabouts.

Styrene can, less desirably, be handled in this way. Its boiling point under atmospheric pressure is 142° C., and a still pot maintained at 150–160° C. can be used, but a temperature of 200° C. is preferable.

Equipment adapted to the operation of the process as one of steam distillation is illustrated in Fig. 4.

A still pot 26 is provided with three openings, through which enter, respectively, an inlet line 27, provided with a valve 28, for the introduction of the polymerizable liquid which is to be distilled, and inlet line 29 with valve 30 for the introduction of steam, and a vapor line 31 which carries the vapors to a condenser 32 leading to a receiving tank 33. The pot 26 may be provided with a heating jacket 34 which serves as a source of heat although in this embodiment of the invention it is not essential, but merely optional, to supply heat from outside the pot 26 since adequate heat may be provided by the steam which is discharged within the flask. This discharge takes place preferably near the bottom of the flask.

In conducting a distillation, e. g. of styrene, by this method, the rates of feed of steam and of polymerizable liquid are so adjusted that the latter is fed in no faster than it can be volatilized. There is thus at no time any pool of styrene in the pot; the polymerizable liquid is volatilized rapidly and completely, leaving behind in the pot only its non-volatile impurities, and the inhibitor which has been mixed with it to preserve it during storage. The condensed styrene and water collected in the receiver are not miscible with each other and form two layers, which are separated in known manner.

If the polymerizable liquid is one which is capable of dissolving traces of water and if it is required that the liquid be received in substantially anhydrous form, it can be dried by being chilled, or by being shaken with an insoluble dehydrating agent, such as anhydrous sodium sulphate, anhydrous calcium sulphate, or other commercial dehydrating agent.

The equipment and process will in general be of the greatest value with polymerizable liquids of high boiling point because with them the temperature required to effect vaporization is more likely to be high enough to induce rapid polymerization, and for the same reason operation under reduced pressure, or with partial pressure of steam, is to be preferred. At the other extreme, the process will be found to have less distinct value for the handling of polymerizable liquids having relatively low boiling points and not subject to rapid polymerization even when boiled under atmospheric pressure.

Obviously, then, in dealing with certain polymerizable liquids it may not be necessary to reduce the temperature of operation by reduction of pressure, or by providing the partial pressure of steam, and operation of the process at atmospheric pressure may be found adequate to eliminate the difficulties with polymerization which are encountered in large batch distillations.

Examples of polymerizable liquids to which the present invention is applicable will include the following which are listed roughly in decreasing order of the difficulty which they present in ordinary distillation: methacrolein, methacrylic acid; acrylates, methacrylates, ethacrylates of higher boiling points; styrene; acrylates, methacrylates, ethacrylates of lower boiling points; vinyl acetate.

The procedure of the invention is found particularly valuable when it is required that the polymerizable liquid be particularly thoroughly freed from impurities and from inhibitor. Obviously the thoroughness of the separation of the inhibitor will depend in part upon whether the inhibitor is itself volatile under the condition of the distillation.

Many inhibitors widely used for the preservation of monomeric polymerizable liquids in storage and shipment tend to volatilize to some extent along with the polymerizable liquid and, hence, it is sometimes found necessary to subject the distilled liquid to a chemical treatment for the destruction of traces of inhibitor carried over with it in the distillation.

It is definitely preferable to use as inhibitor a substance of relatively non-volatile character. The importance of this choice is, of course, the greater when the process is operated at the higher temperatures, as when the temperature selected is well above the minimum required for volatilization of the polymerizable liquid.

Sulphur may advantageously be used as a non-volatile inhibitor but it is preferred to use copper resinate because of its peculiar stability and lack of volatility, along with adequate solubility. With various polymerizable liquids of which styrene is an outstanding example, a uniquely thorough purification can be effected if this inhibitor is used, in preference to others, for preservation during storage and if the removal of the inhibitor, along with any impurities, is carried out by the procedure of the present invention.

For the preservation of polymerizable liquids, e. g. styrene, in storage and transportation, amounts of copper resinate may be used as small as 0.005% and as large as 1.0%, but ordinarily amounts of the order of 0.05% to 0.2% are found adequate. Separation of the styrene from this inhibitor by the procedure of the invention, either under reduced pressure or at atmospheric pressure with the assistance of steam, results in a distilled product of exceptional purity.

The invention offers several advantages corollary to the prevention of polymerization during the distillation of organic liquids polymerizable by heat, namely, the absence of impairment of heat-transfer or of actual plugging of distilling equipment by polymerization therein and the improvement in efficiency and in yields of the distillation. Thus the invention makes readily feasible the purification of liquids of this type even though they be prone to rapid polymerization by heat. Furthermore the invention makes it possible to produce these liquids in unusually pure form, correspondingly free from irregularities of behavior in subsequent processes of polymerization.

As many apparently widely different embodiments of this invention may be made without departing from the spirit and scope thereof, it is to be understood that the invention is not limited to the specific embodiments thereof except as defined in the appended claims.

I claim:

1. Process of separating in pure condition an organic liquid polymerizable by heat to a solid polymer, from a mixture thereof with a non-volatile inhibitor of its polymerization and with minor proportions of non-volatile impurities, said mixture being substantially free from polymer, which process comprises delivering said organic liquid in successive small portions into a vessel and simultaneously delivering into said vessel steam at such relative rate as to flash distill said successive small portions of said organic liquid.

2. Process of separating in pure condition an organic liquid polymerizable by heat to a solid polymer, from a mixture thereof with a non-volatile inhibitor of its polymerization and with minor proportions of non-volatile impurities, said mixture being substantially free from polymer, which process comprises heating said organic liquid in a closed space for a period less than that required to initiate polymerization of said organic liquid and releasing said organic liquid therefrom in successive small portions into a vessel maintained at a temperature such that, under the prevailing conditions, flash distillation of said successive small portions of said organic liquid takes place.

3. Process of separating in pure condition liquid styrene from a mixture thereof with small amounts of copper resinate as a polymerization inhibitor and with minor proportions of non-volatile impurities, said mixture being substantially free from polymer, which process comprises delivering said liquid styrene in successive small portions into a vessel and simultaneously delivering into said vessel steam at such relative rate as to cause the flash distillation of styrene.

4. Process of separating in pure condition an organic liquid polymerizable by heat to a solid polymer, from a mixture thereof with a non-volatile inhibitor of its polymerization and with minor proportions of non-volatile impurities, said mixture being substantially free from polymer, which process comprises flash distilling successive small portions of said liquid.

5. Process of separating in pure condition an organic liquid polymerizable by heat to a solid polymer, from a mixture thereof with a non-volatile inhibitor of its polymerization and with minor proportions of non-volatile impurities, which process comprises flash distilling under reduced pressure successive small portions of said liquid, the heat transfer medium effecting the flash distillation being maintained at a temperature sufficient to cause flash distillation of said successive small portions of said organic liquid at atmospheric pressure.

6. Process of separating in pure condition liquid methyl methacrylate from a mixture thereof with a non-volatile inhibitor of its polymerization and with minor proportions of non-volatile impurities, said mixture being substantially free from polymer, which process comprises flash distilling under reduced pressure successive small portions of said liquid methyl methacrylate, the heat transfer medium effecting the flash distillation being maintained at a temperature sufficient to cause flash distillation of said successive small portions of said liquid methyl methacrylate at atmospheric pressure.

7. Process of separating in pure condition liquid vinyl acetate from a mixture thereof with small amounts of copper resinate as a polymerization inhibitor and with minor proportions of non-volatile impurities, said mixture being substantially free from polymer, which process comprises flash distilling successive small portions of said liquid vinyl acetate.

BARNARD M. MARKS.

CERTIFICATE OF CORRECTION.

Patent No. 2,336,493. December 14, 1943.

BARNARD M. MARKS.

It is hereby certified that error appears in the printed specification of the above numbered patent requiring correction as follows: Page 4, second column, line 67, claim 3, before the word "styrene" insert --said successive small portions of said liquid--; and that the said Letters Patent should be read with this correction therein that the same may conform to the record of the case in the Patent Office.

Signed and sealed this 14th day of March, A. D. 1944.

Leslie Frazer (Seal) Acting Commissioner of Patents.